UNITED STATES PATENT OFFICE.

PERCY R. MIDDLETON, OF NEW YORK, N. Y., ASSIGNOR OF ONE-HALF TO JOHN C. LALOR, OF NEW YORK, N. Y.

METHOD OF EXTRACTING SILVER.

1,372,973.  Specification of Letters Patent.  Patented Mar. 29, 1921.

No Drawing.  Application filed May 11, 1920. Serial No. 380,636.

*To all whom it may concern:*

Be it known that I, PERCY R. MIDDLETON, a subject of the King of Great Britain, residing at New York, in the county of New York and State of New York, have invented certain new and useful Improvements in Methods of Extracting Silver, of which the following is a specification.

This invention is a method of extracting silver, together with any gold which may be present, from argentiferous ores or residues, in which the silver exists wholly or in part in the metallic state. The invention is more particularly applicable to the treatment of residues resulting from the leaching or calcines derived from argentiferous copper or zinc ores, in which residues the silver has been found to exist both as metal and as sulfid; but the applicability of the method is not restricted to these particular materials.

It is well known that certain metallic chlorids, including cuprous and cupric chlorids and ferric chlorid, have a chlorinating action both upon metallic silver and silver sulfid. It has heretofore been universally believed, so far as I am aware, that these chlorinating agents act more readily and completely upon metallic silver than upon silver sulfid. I have discovered, however, as the result of considerable experimentation, that a more complete chlorinating effect is in fact obtained if any silver which may be present as metal is first converted into sulfid.

Accordingly my invention consists in transforming the metallic silver content of such materials as contain the same into sulfid, as a step preliminary to the formation and solution of silver chlorid.

For example I may treat the leached residue or similar material containing metallic silver with hydrogen sulfid or with an alkaline sulfid, or other appropriate sulfidizing agent, whereby the conversion occurs presumably according to the reaction:

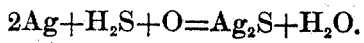

$$2Ag + H_2S + O = Ag_2S + H_2O.$$

This operation may be performed in any approved way, such for example as by agitating the ore or residue in an aqueous solution of hydrogen sulfid for a sufficient period, usually several hours, to convert the silver content to sulfid; the pulp being then filtered and washed. Or the ore or residue may be charged into vats with filter bottoms and a solution of hydrogen sulfid circulated through the mass, either by upward or downward percolation, for a sufficient period to convert the silver to sulfid, the solution being then withdrawn and the ore washed with water. Or if preferred the moist ore or residue may be subjected in a revolving cylinder to the action of air containing hydrogen sulfid.

The resulting sulfidized material is then treated with a suitable chloridizing agent, as cuprous or cupric chlorid or ferric chlorid, or mixtures thereof, preferably in presence of a solvent for silver chlorid. For the latter purpose I may employ solutions of sodium chlorid or of other chlorids having the desired solvent power. After separation of the silver bearing solution from the ore, the silver is precipitated and recovered in any well known way, as for example by the use of metallic copper. Any gold which may be present is simultaneously recovered.

I claim:—

1. Method of extracting silver from ores or residues containing metallic silver, comprising converting the silver content of the material into sulfid, and chlorinating the sulfid.

2. Method according to claim 1 in which the sulfid is chlorinated in presence of a solvent for silver chlorid.

In testimony whereof, I affix my signature.

PERCY R. MIDDLETON.